Daniel R. Pratt.
Compound Rail Road Rails & Splice-Piece.
99787  PATENTED FEB 15 1870
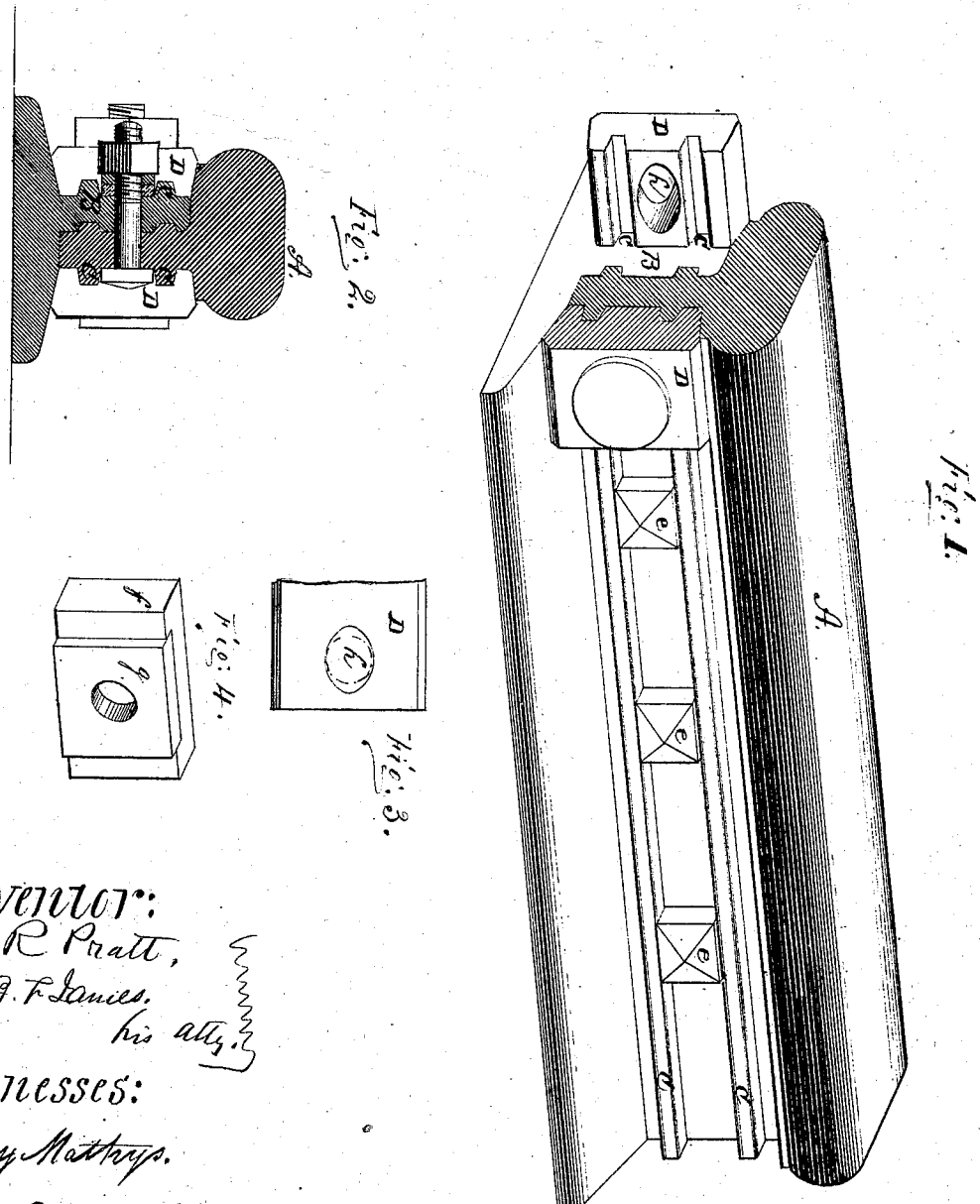
Inventor:
Daniel R Pratt,
by B. F. James.
his atty.
Witnesses:
Godfrey Matthys.
B. Lewis Blackford

UNITED STATES PATENT OFFICE.

DANIEL R. PRATT, OF NEW YORK, N. Y.

IMPROVEMENT IN COMPOUND RAILWAY-RAILS.

Specification forming part of Letters Patent No. 99,787, dated February 15, 1870.

*To all whom it may concern:*

Be it known that I, DANIEL R. PRATT, of the city, county, and State of New York, have invented a new and useful Improvement in Compound Railroad-Rails and Splice-Pieces; and I do hereby declare the following to be a full, clear, and exact description of the construction and operation of the same, reference being had to the annexed drawings, making a part of this specification.

The nature of my invention consists in the construction of a railroad-rail in two parts, one part being furnished with a tread of the shape of an ordinary T-rail, the other part being constructed so that the base of the rail is attached to it and the vertical web of the latter projecting upward far enough to abut firmly against the head of the upper portion of the rail, while the support for the web of the rail, having upon it the tread, is the base of its counterpart, said rails having formed upon the outer side of each of them continuous ribs or projections, two in number, between which ribs bolts are applied, and their heads prevented from turning by fitting between the ribs so formed.

In the drawings, Figure 1 represents a perspective view of the rails, splice-pieces, and the mode of bolting them together; Fig. 2, a cross-section of the same where spliced; Fig. 3, a portion of the splice-piece, showing an elliptical hole for the reception of the bolt, and Fig. 4 a washer and mode of securing rubber or elastic packing within it.

In the drawings, A represents the rail, to which the head or tread is attached; B, the counterpart of the same or supporting-rail. These two rails may be connected on their inner sides by tongues or grooves, or the abutting-surfaces may be plain; but this connection forms no part of my present invention. The two outer sides of the rails A and B have formed upon them continuous ribs or projections C C C C, as shown in Figs. 1 and 2, and the two rails, when thus constructed, are bolted together, as shown at *e e e*, the heads of the bolts being made of the size indicated by the width between the two ribs C C'. By this means the heads of the bolts are prevented from turning, and are less liable to become loosened by the passage of the trains over the rails, corresponding ribs being constructed upon the opposite rail. The washers and rubber packing are placed within the grooves formed by the projecting ribs, and the nut applied, holding the two rails firmly together.

The splice-pieces D D are constructed in such a way as to fill up the spaces between the bases of the rail B and the under side of the head of the rail A, and have formed on their inner side grooves conforming in shape and size to the ribs formed on either rail. By this mode of construction a rigid and firm connection is made by the two rails referred to, as also of the abutting rail, and preventing in a great degree the wear and destruction of the ends or joints of abutting rails. By this construction, when it is deemed necessary to cut off the ends of the rails on account of their wear or injury to them in any way, these splice-pieces are always ready to be applied.

What I claim as my invention, and desire to secure by Letters Patent, is—

A compound railroad-rail composed of the two parts, A and B, and each of said parts has formed upon its outer sides the ribs or projections C C, constructed, arranged, and bolted together in the manner and for the purpose herein described.

DANIEL R. PRATT.

Witnesses:
GODFREY MATHYS,
B. F. JAMES.